Nov. 11, 1952

A. A. COLLINS 2,617,985

FREQUENCY CONTROL SYSTEM

Filed Feb. 23, 1950

3 Sheets-Sheet 1

INVENTOR
ARTHUR A. COLLINS
BY Marvin Moody
ATTORNEY

INVENTOR
ARTHUR A. COLLINS
BY Marvin Moody
ATTORNEY

Nov. 11, 1952 A. A. COLLINS 2,617,985

FREQUENCY CONTROL SYSTEM

Filed Feb. 23, 1950 3 Sheets-Sheet 3

INVENTOR
ARTHUR A. COLLINS
BY Marvin Moody
ATTORNEY

UNITED STATES PATENT OFFICE 2,617,985

FREQUENCY CONTROL SYSTEM

Arthur A. Collins, Cedar Rapids, Iowa, assignor to Collins Radio Company, Cedar Rapids, Iowa, a corporation of Iowa Application February 23, 1950, Serial No. 145,767

11 Claims. (Cl. 343—179)

This invention relates in general to frequency control systems and in particular to a system which periodically checks the frequency of a receiver and a transmitter.

It is very desirable to maintain frequency of reception and transmission constant. Frequency drift in a receiver lowers the effective strength of the incoming signal and sometimes makes it impossible to detect it. Frequency drift in a transmitter causes interference with channels which have not been assigned to the transmitter and prevents reception by a receiver on the assigned frequency.

The rate of change of frequency in a transmitter or receiver may be relatively low and a set once accurately adjusted to the correct frequency might maintain it within a few cycles for a number of minutes. It is unnecessary, therefore, to check the frequency constantly with a complicated frequency control system, because a periodic check and correction will maintain the correct frequency within allowable tolerances.

It is an object of this invention, therefore, to provide a frequency control system which periodically checks frequency and corrects any error present.

A further object of this invention is to provide a frequency control system which takes advantage of the inherent frequency stability of oscillators over a short time interval.

Further objects, features, and advantages of this invention will become apparent from the following description and claims when read in the light of the drawings, in which;

Figure 1:
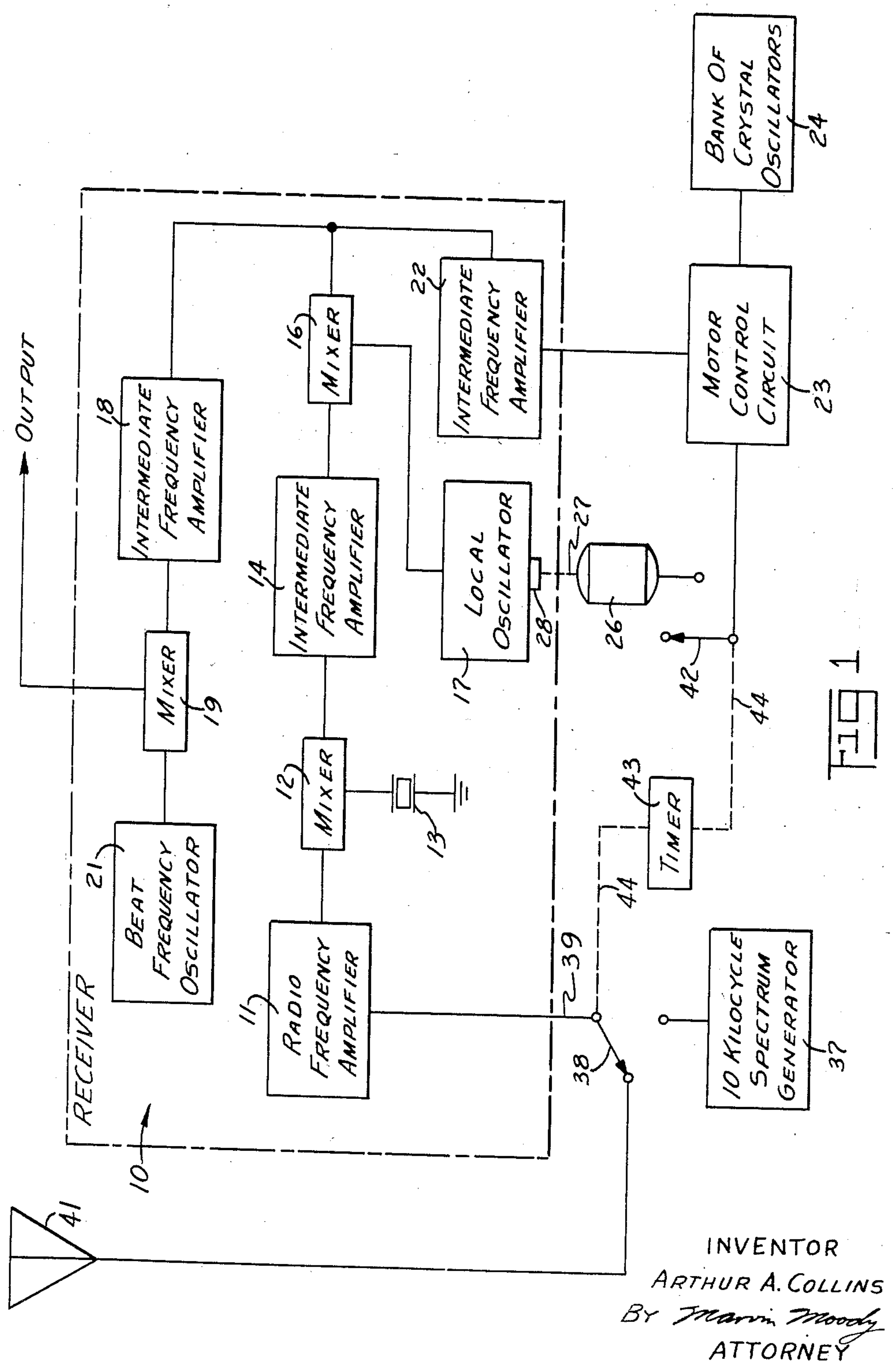
Figure 1 is a schematic illustration of the frequency control system of this invention connected to a receiver.

Referring to Figure 1, a receiver, designated generally as 10 is of the super-heterodyne type and includes the radio frequency stage 11 which feeds a mixer 12. The mixer 12 also receives an input from a crystal oscillator 13 and gives an intermediate frequency output to the amplifier 14. A second mixer 16 receives the output from amplifier 14 and an output from a tunable local oscillator 17. The output of mixer 16 is furnished to a second intermediate frequency stage 18. The mixer 19 receives an output from the intermediate stage 18 and an output from a beat frequency oscillator 21. For purposes of explanation and clarity, examples of frequency will be used, but it is to be understood that the invention is not to be limited to the particular frequencies used herein. The frequency of the oscillator 21 is 500 kilocycles per second and the intermediate stage 18 has a band-pass filter with a center frequency of 500 kilocycles, and thus, it is desirable to have an output from the mixer 16 of 500 kilocycles. The output of mixer 19 is at audio frequency and is furnished to suitable amplifying and utilizing apparatus.

An intermediate frequency amplifier 22 also receives an output from mixer 16 and supplies it to an automatic frequency motor control circuit, designated generally as 23. The motor control circuit 23 also receives an output from a bank of crystal oscillators 24. Crystals may be selected which vibrate between 495 to 505 kilocycles at intervals of one kilocycle, for example. The motor control circuit 23 compares the two input signals and gives an output which controls a two phase motor 26. The motor 26 varies the frequency of the tunable local oscillator 17 with the trimmer shaft 27 connected to a frequency control 28. The motor control circuit 23 drives the motor 26 until the output of mixer 16 is at the same frequency as the output of the selected crystal in the crystal bank 24. For example, if the selected crystal oscillates at 498 kilocycles, the motor 26 adjusts the frequency of local oscillator 17 until the mixer 16 gives an output of 498 kilocycles.

Figure 3:
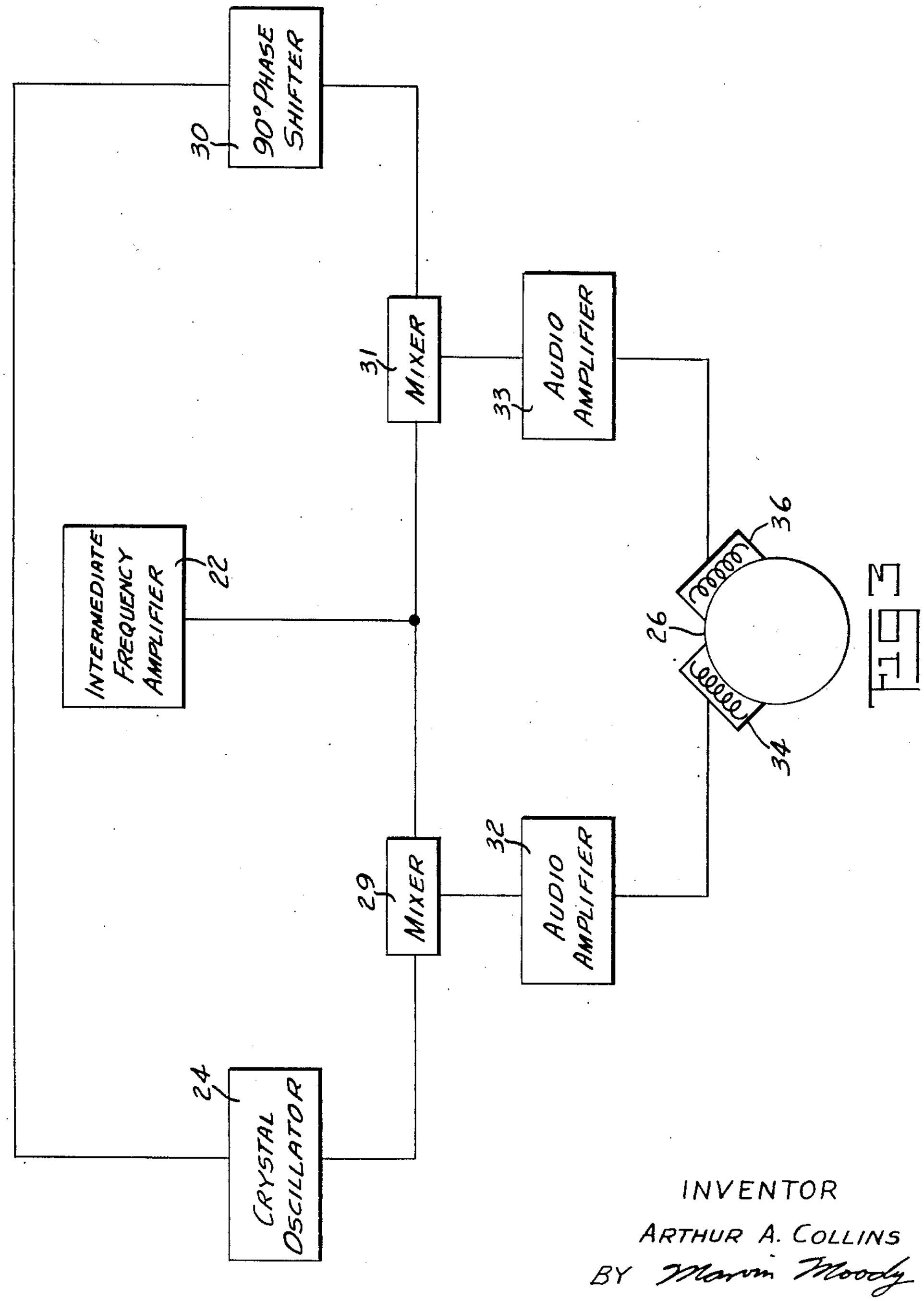

The motor control circuit is illustrated in Figure 3. A mixer 29 receives an output from the selected crystal in the crystal bank 24, and an output from the intermediate frequency amplifier 22. Another mixer 31 receives a signal from the amplifier 22 and a signal from a 90-degree phase-shift network 30. The phase-shift network 30 receives a signal from the selected crystal in the crystal bank 24. The outputs from mixers 29 and 31 are furnished to amplifiers 32 and 33, respectively. A two-phase induction-hysteresis motor 26 has its first winding 34 connected to the amplifier 32 and its second winding 36 to the amplifier 33. The two windings are displaced 90 degrees. The mixers 29 and 31 will give an output frequency equal to the difference between the input frequencies. The motor 26 will turn in such a direction as to make the output of mixer 16 equal to the selected crystal frequency. This is accomplished by adjustment of the local oscillator control 28 through the trimmer shaft 27. When the adjustment is such that the frequency difference between the inputs to mixers 29 and 31 is zero, the motor 26 will cease rotation and the frequency from amplifier 22 is equal to the frequency of the selected crystal. With the motor 26 operating as a synchronous-hysteresis motor, frequency control can be obtained which will correct errors less than one-half cycle per second.

A spectrum generator 37 produces an output which has spectrum lines every 10 kilocycles between 500 kilocycles and 35 megacycles, for example. Such spectrum generators are well-known to those skilled in the art.

A switch 38 may connect the receiver input 39 to the spectrum generator 37. In another position the switch 38 connects the receiver to an antennae 41.

Suppose it is desired to receive on a frequency of 14,312 kilocycles. The receiver is band-switched to the 13.5–14.5 megacycle range and a marker moved by a main control dial to 14.3 megacycles. A second vernier dial is adjusted to read 12 kilocycles and the set is pre-tuned to approximately 14,312 kilocycles. Any common method of pre-tuning a receiver may be used to obtain the approximate setting. For illustrative purposes, it will be assumed that the receiver is manually tunable to within three kilocycles of the desired frequency.

To check the manual setting of frequency, the switch 38 is moved to select an output from the spectrum generator 37. Since the receiver will lock-on to the nearest spectrum line, a frequency of 14,310 kilocycles will be obtained. The input frequency is therefore two kilocycles less than the frequency which it is desired to receive.

Since there is no frequency multiplication within the set the output of mixer 16 will be two kilocycles less when connected to the 14,310 kilocycle spectrum line than it would be if the receiver was receiving 14,312 kilocycles from the antennae 41. It is desired to obtain 500 kilocycles from mixer 16 during reception, and if its output is adjusted to 498 kilocycles when the receiver is receiving the 14,310 kilocycle spectrum line, it will shift to 500 kilocycles when the input is changed to 14,312 kilocycles.

In order to set the mixer output at 498 kilocycles, a crystal with an output of 498 kilocycles is selected from the crystal bank 24 and the motor control circuit 23 adjusts the output of the local oscillator 17 until 498 kilocycles is obtained from the mixer 16. The switch 42 connects the motor control circuit 23 to the motor 26 when frequency is to be checked.

After the output of mixer 16 has been adjusted to 498 kilocycles, the switch 38 is moved back to the antennae 41 and the switch 42 disconnects the motor control circuit from the motor 26. Since the incoming signal has a frequency of 14,312 kilocycles, the output of mixer 16 will now be 500 kilocycles.

As is generally the case, once the frequency of a receiver has been set it will be stable for a period of time. For example, many tunable oscillators will maintain frequency stability for a number of minutes, and thus, if the frequency is corrected only periodically, the frequency will be maintained very stable. A timer 43 is connected to switches 38 and 42 by mechanical linkage 44 and periodically moves them in synchronism. In the position shown in Figure 1 the receiver is connected for reception of intelligence. At predetermined intervals of time the timer 43 moves switches 38 and 42 to the "test" position so that the input is connected to spectrum generator 37 and the motor control circuit is connected to the motor 26. The automatic control circuit then readjusts the frequency and the timer moves the switches 38 and 42 back to the "reception" position. The time for checking is very short (two seconds approximately) and can be arranged so as not to interfere with reception of intelligence.

Figure 2:
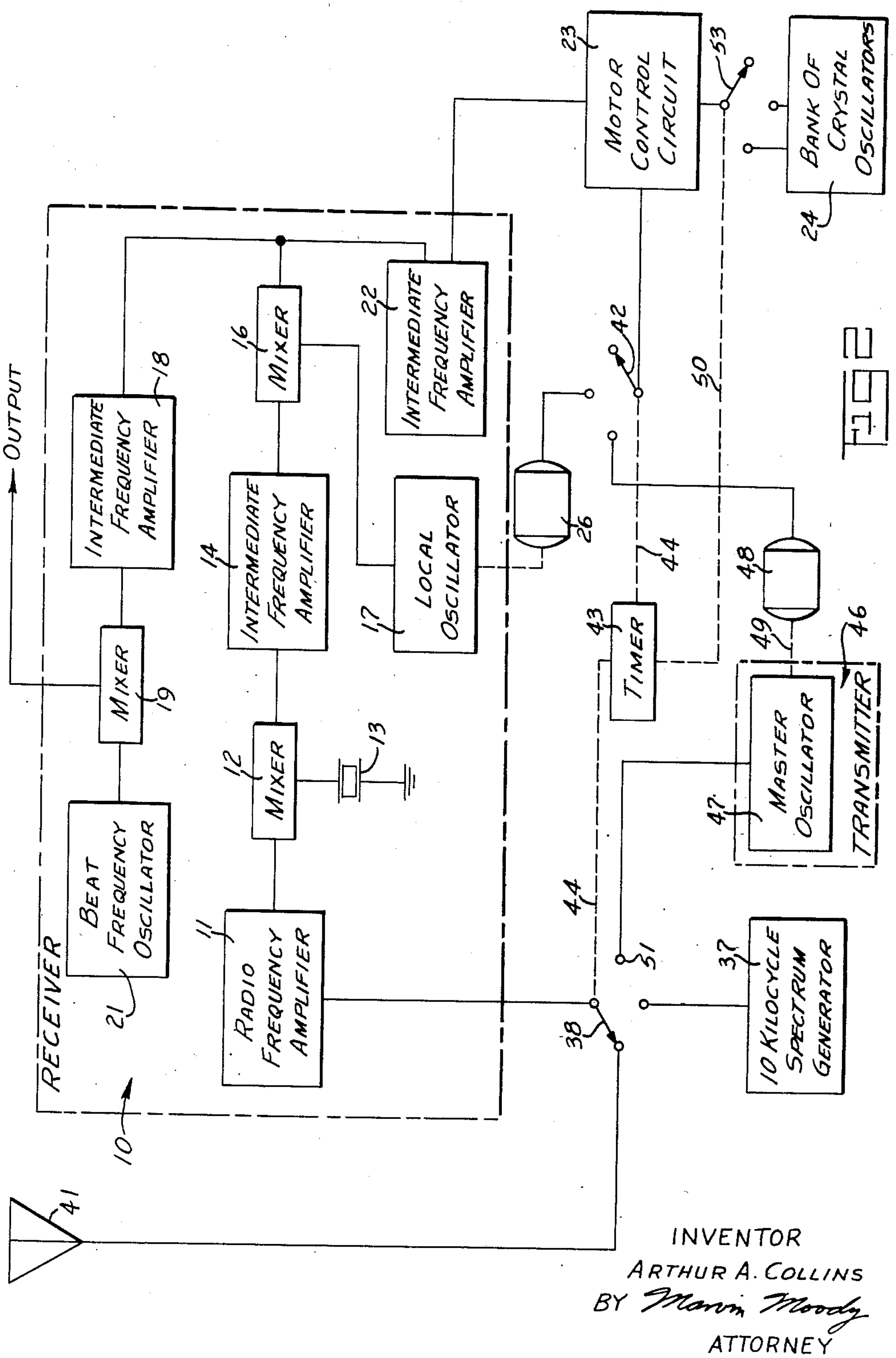
Figure 2 is a schematic drawing illustrating the frequency control system in combination with a transmitter and receiver; and, Figure 3 is a detailed illustration of the control circuit for the trimmer-motor.

Figure 2 illustrates the receiver of Figure 1 in combination with a transmitter, designated generally as 46. The frequency of the transmitter is determined by a tunable master oscillator 47. A motor 48 is connected to the frequency control shaft 49 of the master oscillator 47. The frequency of the transmitter is manually adjusted to the desired frequency and the switch 38 is moved by the timer 43 to a contact 51 which receives an output from the master oscillator 47. The motor control circuit 23 is simultaneously switched to control the motor 48 and a switch 53 on the crystal bank is moved to connect a 500 kilocycle crystal to the motor control circuit 23. Since the receiver has been recently adjusted to the correct frequency in the manner previously explained, when the output of mixer 16 is 500 kilocycles, the output of the transmitter will be 14,312 kilocycles. Thus the motor control circuit 23 compares the output from the 500 kilocycle crystal with the output of the mixer 16 and drives motor 48 until the mixer output is 500 kilocycles. Then it is known that the transmitter is giving a 14,312 kilocycle signal. After the adjustment has been made, the switch 38 is moved to the spectrum generator 37 and the switch 42 is moved to the receiver-check position.

Thus the frequency of the receiver may be controlled by the crystal bank 24 and the spectrum generator 37, and the frequency of the transmitter may be controlled by the receiver 10 and the crystal bank 24.

The timer 43 is connected to switches 38, 42 and 53 by the mechanical linkage 44 and 59. During reception switch 38 is moved from an antennae-connect position to a spectrum generator position, while switch 42 moves from a disconnect position to the control position for motor 26 and switch 53 selects the correct crystal. During transmission, the timer 43 moves switches 38, 42 and 53, from a first position where 38 is connected to the spectrum generator, 42 is connected to the motor 26 and 53 is connected to a selected crystal (498 kc. for example), to a second position where 38 is connected to the transmitter oscillator 47, 42 is connected to the motor 48, and 53 is connected to a 500 kilocycle crystal.

Although particular examples of frequency have been used, the invention is not to be so limited because they are merely for explanatory purposes so that the invention might be more easily understood. Changes in positioning and connecting the spectrum generator, crystal bank, and motor control circuits are within the scope of this invention. Whether the frequency adjustment is made in an intermediate frequency stage or some other stage is immaterial as far as the broad scope of the invention is concerned.

I claim:

1. A frequency control system for a radiant energy receiver having a constant frequency intermediate stage comprising, a spectrum generator producing a plurality of outputs spaced apart by a constant number of cycles, the receiver receiving an input from said spectrum generator, a plurality of crystal oscillators, a tunable local oscillator in said receiver supplying an input to said intermediate frequency stage, driving means connected to said local oscillator for changing its frequency, a control circuit receiving an input from one of said crystal oscillators and an input from said intermediate frequency stage of the receiver, and said control circuit connected to said driving means and producing an output which causes the driving means to adjust the local oscillator frequency until the intermediate frequency is the same as that of the crystal oscillator.

2. A frequency control system for a radiant energy receiver comprising first switching means connected to the receiver input terminal, an antennae for receiving radiant energy, a spectrum generator producing a plurality of known spectrum lines over a wide frequency range, said first switching means movable to a first position to connect the receiver to the antennae and movable to a second position to connect the receiver to the spectrum generator, a mixer in said receiver receiving an input signal, a tunable local oscillator within said receiver and furnishing an output to said mixer, driving means connected to said local oscillator for adjusting its frequency, a bank of crystal oscillators, a control circuit receiving an output from said mixer and an output from a crystal oscillator to produce an output proportional to the frequency difference between the incoming signals, second switching means receiving the output of said control circuit and movable to a first position to produce an open circuit and movable to a second position to connect the output of the control circuit to said driving means, said first and second switching means linked together so that they move together from the first to the second position, and said driving means adjusting the frequency of said local oscillator until the output of the control circuit has substantially zero frequency.

3. In a frequency control system according to claim 2 wherein a master timer periodically moves the first and second switching means from the first position to the second position and then moves them back to the first position again.

4. In a frequency control system a motor control circuit for a two phase motor comprising, a first mixer receiving an input from a known frequency source and an input from an unknown frequency source, a second mixer receiving the unknown frequency source and an input from a 90 degree phase shifter, the 90 degree phase shifter receiving an output from the known frequency source, and the output of said first and second mixers furnished to respective phases of said motor.

5. In a frequency control system a motor control circuit for a two phase motor comprising, a first mixer receiving an input from a known frequency source and an input from an unknown frequency source, a second mixer receiving an input from the known frequency source and an input from a 90 degree phase shifter, the 90 degree phase shifter receiving an output from the unknown frequency source, and the output of said first and second mixers furnished to respective phases of said motor.

6. A frequency control system for a radiant energy receiver comprising, an antennae for receiving radiant energy, a spectrum generator, a first switching means movable to a first position to receive an input from said antennae and movable to a second position to receive an input from said spectrum generator, a first mixer within the receiver receiving a signal which has passed from the first switching means through various radio stages, a tunable local oscillator furnishing an output to the first mixer, a stable oscillator, a second mixer receiving an input from the stable oscillator and an input from the first mixer, a 90 degree phase shifter receiving an output from the stable oscillator, a third mixer receiving an output from the phase shifter and an output from the first mixer, a two phase motor with the output of the second mixer connected to one phase and the output of the third mixer connected to the other phase thereof, said motor mechanically connected to the frequency control of said local oscillator, second switching means movable to a first position to disconnect the inputs to both phases of said motor and movable to a second position to connect the inputs to both phases of said motor, and switch control means connected to said first and second switching means to move them periodically from the first to the second position.

7. A frequency control system for a transmitter having a tunable master oscillator, a trimmer shaft connected to said master oscillator for varying its frequency, driving means connected to said shaft, a driving means control circuit furnishing an output to said driving means, a stable oscillator furnishing an output to said control circuit, a receiver which has been previously tuned to the desired transmitter output, said receiver receiving an output from said master oscillator, and said control circuit receiving an output from said receiver.

8. A frequency control circuit for a receiver and a transmitter, having a tunable master oscillator, comprising an antennae, a spectrum generator, a first three-way switch connected to the input of the receiver and movable to a first position to connect the receiver with the antennae, movable to a second position to connect the receiver to the spectrum generator, and movable to a third position to connect the receiver to said tunable master oscillator, a tunable local oscillator in the receiver, a mixer receiving an input from said local oscillator and an input from the prior receiver stages, a driving means control circuit receiving a signal from said mixer, a bank of crystal oscillators with one of said oscillators furnishing an output to said control circuit, a first driving means connected to the local oscillator for adjusting its frequency, a second driving means connected to the master oscillator for adjusting its frequency, and a second three-way switch receiving the output of said control circuit and movable to a first open circuit position, to a second position connecting the control circuit with the first driving means, and to a third position connecting the control circuit with the second driving means.

9. In a frequency control system according to claim 8 wherein a master timer controls the first and second three-way switches by linking means connecting mechanically said first and second switches together so that they move together and are in the first, second, and third positions together, and said timer actuating said linking means to move the switches from the first to the second position and from the second to the first position.

10. In a frequency control system according to claim 8 wherein a selecting means changes from one crystal oscillator in the crystal bank to a second crystal oscillator when the three-way switches move from the second to the third position.

11. In a frequency control system according to claim 8 wherein a master timer controls the first and second three-way switches by mechanical linkage connecting said switches together so that they move together, and said timer actuating said linkage to move the switches from the second position to the third position, and from the third to the second position.

ARTHUR A. COLLINS.

REFERENCES CITED

The following references are of record in the file of this patent:

UNITED STATES PATENTS

| Number | Name | Date |
|---|---|---|
| 2,011,953 | Somers | Aug. 20, 1935 |
| 2,311,522 | Conron et al. | Feb. 16, 1943 |
| 2,452,601 | Ranger | Nov. 2, 1948 |
| 2,474,278 | Ranger | June 28, 1949 |
| 2,476,840 | Colander | July 19, 1949 |
| 2,543,058 | Ranger | Feb. 27, 1951 |
| 2,568,412 | Robinson | Sept. 18, 1951 |